US008377321B2

(12) United States Patent
Van De Sande et al.

(10) Patent No.: US 8,377,321 B2
(45) Date of Patent: Feb. 19, 2013

(54) METHOD OF FORMING A NOZZLE AND AN INK CHAMBER OF AN INK JET DEVICE BY ETCHING A SINGLE CRYSTAL SUBSTRATE

(75) Inventors: Henricus Johannes Adrianus Van De Sande, Geldrop (NL); Willem Maurits Hijmans, Amersfoort (NL); Gerardus Johannes Burger, Hengelo (NL); Dionysius Antionius Petrus Oudejans, Enschede (NL)

(73) Assignee: Oce Technologies B.V., Venlo (NL)

( * ) Notice: Subject to any disclaimer, the term of this patent is extended or adjusted under 35 U.S.C. 154(b) by 83 days.

(21) Appl. No.: 12/959,130

(22) Filed: Dec. 2, 2010

(65) Prior Publication Data

US 2011/0132872 A1 Jun. 9, 2011

Related U.S. Application Data

(63) Continuation of application No. PCT/EP2009/056925, filed on Jun. 5, 2009.

(30) Foreign Application Priority Data

Jun. 6, 2008 (EP) .................................... 08157747

(51) Int. Cl.
*B44C 1/22* (2006.01)
*C03C 15/00* (2006.01)
*C23F 1/00* (2006.01)

(52) U.S. Cl. ........................................... 216/57; 216/58

(58) Field of Classification Search .................... 216/57, 216/58

See application file for complete search history.

(56) References Cited

U.S. PATENT DOCUMENTS

| | | | | |
|---|---|---|---|---|
| 6,171,510 | B1 | 1/2001 | Lee | |
| 6,554,403 | B1 | 4/2003 | Chen et al. | |
| 6,930,055 | B1 | 8/2005 | Bhowmik et al. | |
| 2003/0081069 | A1* | 5/2003 | Kim et al. | 347/56 |
| 2006/0146102 | A1* | 7/2006 | Kim et al. | 347/85 |

FOREIGN PATENT DOCUMENTS

| | | | |
|---|---|---|---|
| EP | 1138491 | A2 | 10/2001 |
| EP | 1138492 | A1 | 10/2001 |
| EP | 1693206 | A1 | 8/2006 |
| JP | 2007-210242 | A | 8/2007 |
| JP | 2007-269016 | A | 10/2007 |

OTHER PUBLICATIONS

Written Opinion of the International Searching Authority for PCT/EP2009/056925 dated Sep. 2, 2009.

* cited by examiner

*Primary Examiner* — Duy Deo
*Assistant Examiner* — Mahmoud Dahimene
(74) *Attorney, Agent, or Firm* — Birch, Stewart, Kolasch & Birch, LLP

(57) ABSTRACT

A method of forming a nozzle and an ink chamber of an ink jet device, includes forming a nozzle passage by subjecting a substrate to a directional first etch process from one side of the substrate; applying a second etch process from the same side of the substrate for widening an internal part of the nozzle passage, to form a cavity forming at least a portion of the ink chamber adjacent to the nozzle; and controlling the shape of the cavity by providing, on the opposite side of the substrate, an etch accelerating layer buried under an etch stop layer and by allowing the second etch process to proceed into the etch accelerating layer. The following steps precede the first etch process: forming an annular trench in the substrate on the side of the substrate where the nozzle is to be formed; and passivating the walls of the trench so as to become resistant against the second etch process. The material surrounded by the trench is removed in the first etch process.

7 Claims, 3 Drawing Sheets

METHOD OF FORMING A NOZZLE AND AN INK CHAMBER OF AN INK JET DEVICE BY ETCHING A SINGLE CRYSTAL SUBSTRATE

CROSS-REFERENCE TO RELATED APPLICATIONS

This application is a Continuation of International Application No. PCT/EP2009/056925, filed on Jun. 5, 2009, and for which priority is claimed under 35 U.S.C. §120, and claims priority under 35 U.S.C. §119(a) to Application No. 08157747.0, filed in Europe on Jun. 6, 2008. The entirety of each of the above-identified applications is expressly incorporated herein by reference.

BACKGROUND OF THE INVENTION

1. Field of the Invention

The invention relates to a method of forming a nozzle and an ink chamber of an ink jet device, wherein a nozzle passage is formed by subjecting a substrate to a directional first etch process from one side of the substrate. A second etch process is applied from the same side of the substrate for widening an internal part of the nozzle passage, thereby to form a cavity forming at least a portion of the ink chamber adjacent to the nozzle. The shape of the cavity is controlled by providing, on the opposite side of the substrate, an etch accelerating layer buried under an etch stop layer and by allowing the second etch process to proceed into the etch accelerating layer.

2. Background of the Invention

A method of the type indicated above is known from EP-A-1 138 492.

SUMMARY OF THE INVENTION

It is an object of the invention to provide a method of this type which permits a better control of the shape and alignment of the nozzle passage.

According to the invention, this object is achieved by a method in which the following steps precede the first etch process: forming an annular trench in the substrate on the side where the nozzle is to be formed, and passivating the walls of the trench so as to become resistant against the second etch process, and in which the material surrounded by the trench is removed in the first etch process.

When the material surrounded by the trench has been removed and the nozzle passage has been formed in the first etch process, the position, peripheral shape and depth of the nozzle-forming end of the nozzle passage will be defined precisely by the trench. The etch accelerating layer causes the second etch process to proceed rapidly along the boundary of the etch stop layer, so that a cavity is obtained which is delimited on the side opposite to the nozzle by a flat layer, i.e. a portion of the etch stop layer. Since the two etch processes for forming the nozzle passage and the cavity can be performed from the same side of the substrate, the alignment of the nozzles and cavities is greatly facilitated.

Preferred embodiments of the invention are indicated in the dependent claims.

The portion of the etch stop layer that delimits the cavity may form a membrane or at least part of a membrane through which the force of an actuator is transmitted onto the ink in the ink chamber.

The second etch process is preferably a unisotropic process in which the etch rate depends on the crystallographic directions of the substrate. Then, by using a mono-crystalline substrate with suitable crystal orientation, it is possible to obtain a pyramid-shaped cavity whose walls taper towards the nozzle.

The invention has a particular advantage that the extension of the ink chamber in the directions normal to the nozzle direction can be controlled and, in particular, limited by controlling the depth to which the nozzle passage is etched in the first etch process. When, for example, the nozzle passage is etched to such a depth that it actually reaches the etch accelerating layer, this etch accelerating layer will be etched away relatively rapidly, so that the second etch process can be stopped after a relatively short time, resulting in a small cross-section of the ink chamber, irrespective of the thickness of the substrate. A small cross-section of the ink chamber in combination with a large thickness of the substrate has an advantage that the ink chambers in an array of ink jet devices formed in a single wafer can have a sufficiently large volume and can nevertheless be arranged with narrow spacings, so as to permit a high density of actuators, leading to a high print resolution.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
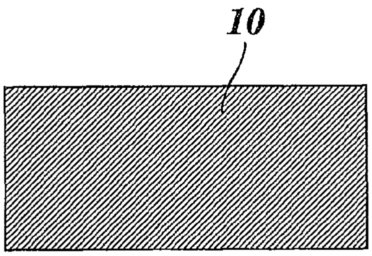
FIGS. 1-12 are cross-sectional views of a portion of a substrate in which an ink jet device is formed by means of a method according to the invention.

The present invention will now be described with reference to the accompanying drawings, wherein the same reference numerals have been used to identify the same or similar elements throughout the several views.

FIG. 1 illustrates a cross-section of a part of a substrate 10 which is formed by a single-crystal silicon wafer.

Figure 2:
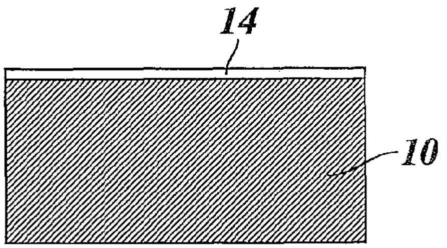
Figure 3:
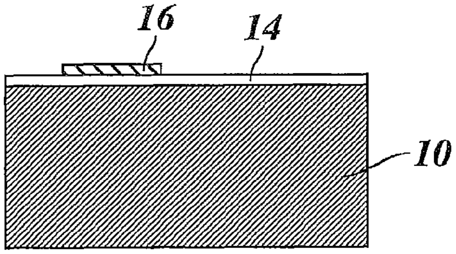
Figure 4:
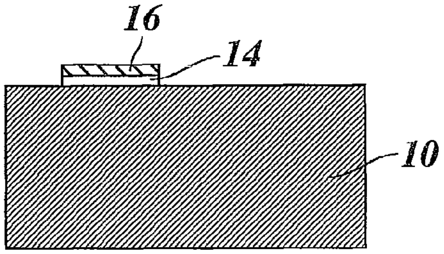

As is shown in FIG. 2, an etch accelerating layer 14, e.g. of poly-silicon, is applied on the top surface of the substrate 10, e.g., by means of sputtering. Then, a part of the layer 14 is masked with a resist 16 (FIG. 3) and the poly-silicon layer 14 is etched away where it is not protected by the resist 16 (FIG. 4). To this end, an RIE etch process may be employed, the duration of which is selected such that the poly-silicon is removed entirely where it is not protected by the resist, but over-etching of the core material of the substrate 10 is reduced to minimum.

Figure 5:
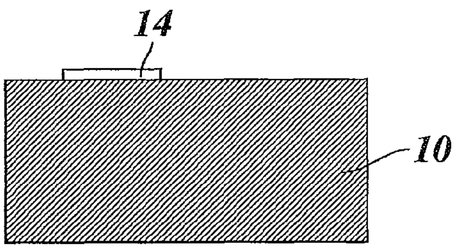
Figure 6:
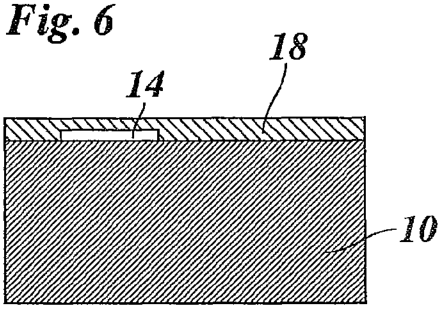

Then, the resist 16 is stripped away (FIG. 5) and the etch accelerating layer 14 is buried in an etch stop layer 18, as is shown in FIG. 6. The layer 18 is an SiRN layer that is applied with LPCVD.

Figure 7:
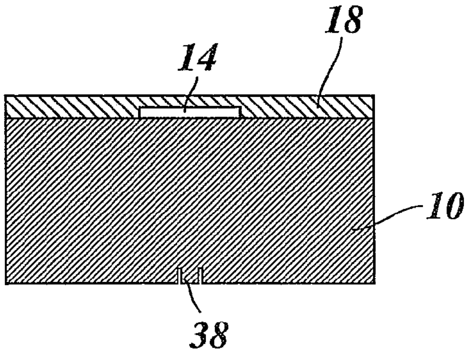

Then, as is shown in FIG. 7, an annular trench 38 is formed in the bottom surface of the substrate 10 by means of known photolithographic techniques. Then, the entire substrate is exposed to an oxidizing atmosphere, so that a protective oxide layer 40 (FIG. 8) is formed on the bottom surface of the substrate 10 and on the internal walls of the annular trench 38. Moreover, an SiRN layer 42 is formed on the oxide layer 40 by means of LPCVD, which also increases the thickness of the layer 18.

In the example shown, an actuator 44 for the ink jet device is formed on the layer 18 above the etch accelerating layer 14. For example, the actuator 44 may be a piezoelectric actuator with electrodes and layers of piezoelectric material that are formed one by one on the surface of the layer 18.

Then, after a suitable mask (not shown) has temporarily been formed on the bottom surface of the layer 42, a nozzle passage 28 is formed by deep reactive ion etching (DRIE). This etch process removes among others the part of the substrate 10 that had been surrounded by the trench 38, whereas the oxide layer 40 remains on the walls of the trench.

Figure 10:
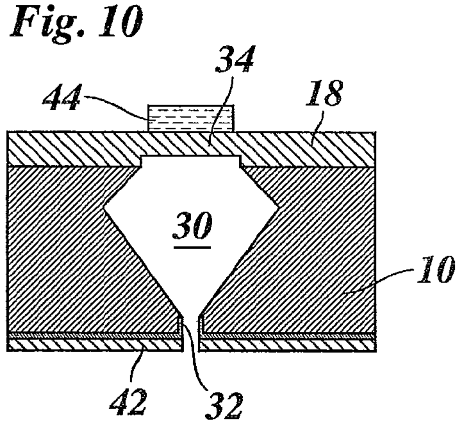

Then, as is shown in FIG. 10, a KOH wet etch process is applied. In the example shown, the substrate 10 is a <100> wafer. The etch rate of the KOH etch process is slowest in the crystallographic <111> directions. As a consequence, the part of the nozzle passage 28 passing through the Si substrate is widened to form a cavity 30, the walls of which are formed by <111> planes that form an angle of 54, 74° with the surfaces (<100> planes) of the substrate and, accordingly, an angle of 35, 26° with the axis of the nozzle passage 28. Optionally, the etch process may be assisted and accelerated by applying ultrasonic vibrations.

On the other hand, the SiRN layers 42 and 18 and the oxide layer 40 are not substantially affected by this etch process, so that the parts of the nozzle passage 28 that pass through the layer 42 and through the material that had been surrounded by the trench 38 are not widened and form a straight nozzle 32 with uniform cross-section. It will be appreciated that the length of this nozzle 32 can be finely controlled by appropriately selecting the thickness of the layer 12 and the depth of the trench 38.

Since the etch solution in the wet etching process has access to the silicon substrate 10 only through the nozzle 32, the etch process will start from the internal end of this nozzle. This results in a pyramid like shape of the cavity 30, wherein the walls of this cavity taper exactly towards the nozzle 32. This method thus has an advantage that the cavity 30, i.e. the ink chamber, has very smooth walls defined by the crystallographic planes, which taper towards the nozzle 32. The taper of these walls is inherently centered onto the nozzle with high accuracy. This assures a high and reproducible quality of the ink jet devices.

Figure 9:
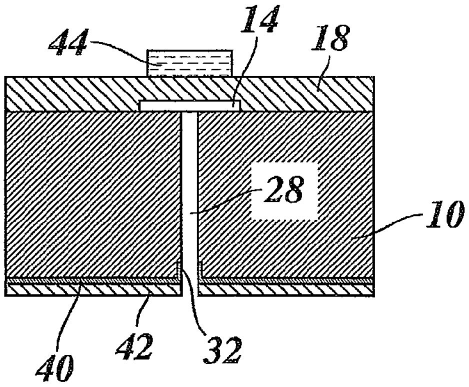

Since the nozzle passage 28 (FIG. 9) traverses the entire thickness of the substrate 10 and reaches the etch acceleration layer 14, the KOH etching proceeds from the entire length of the nozzle passage and, further, with a particularly high etch rate in the etch acceleration layer 14, so that the cavity 30 finally assumes the rhombic shape shown in FIG. 10. The (very thin) etch acceleration layer 14 is removed in this process, so that a top wall 34 of the cavity 30 is formed by the portion of the etch stop layer 18 that has covered the layer 14.

Figure 13:
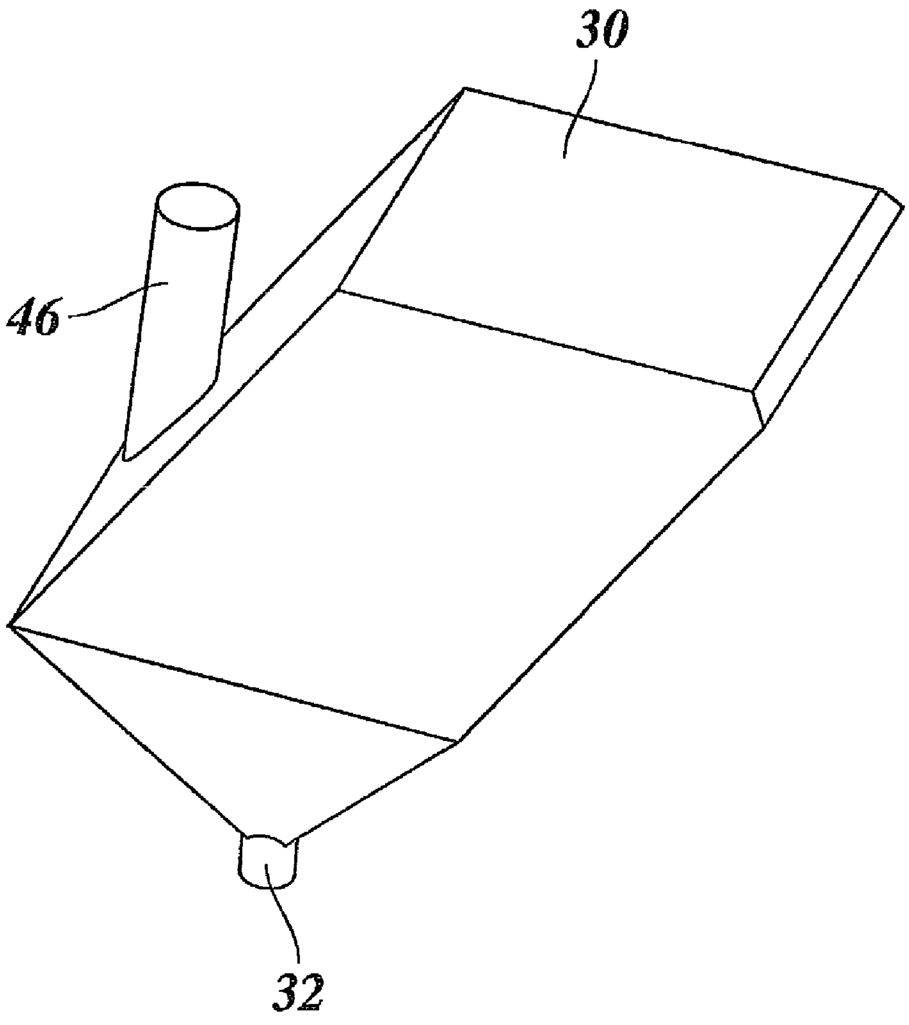
FIG. 13 is a perspective view of an ink chamber formed by means of the method illustrated in FIGS. 1-12.

Moreover, in the cross-sectional plane that has been shown in FIGS. 1 to 10, the etch accelerating layer 14 is symmetric with respect to the nozzle passage 28, so that, in this cross-section, the cavity 30 will also assume a symmetric configuration with respect to the nozzle 32. The exact three-dimensional shape of the cavity 30 is shown more clearly in FIG. 13.

In FIG. 10, the actuator 44 is located on the top wall 34 of the cavity 30. When the piezoelectric actuator 44 is of a type that deforms in a bending mode, the wall 34 behaves as a flexible membrane that is flexed by the actuator 44.

Figure 11:
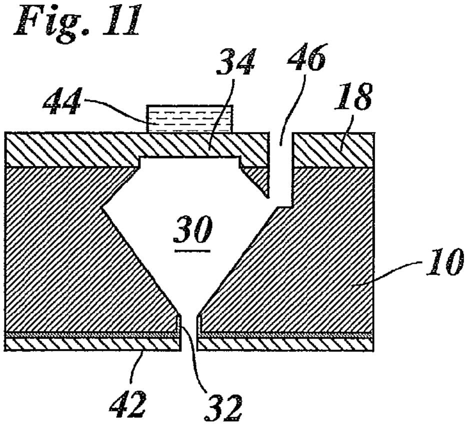

In a further process step, shown in FIG. 11, an ink supply passage 46 is formed by DRIE through the top etch stop layer 18 and part of the substrate 10, i.e. from the side opposite to the nozzle 32, in a position offset from the top wall 34 but still intersecting the largest cross-section of the cavity 30. By controlling the etch time, the depth of the passage 46 is controlled such that it communicates with the cavity 30 without forming a blind hole. Optionally, when the cross-section of the ink supply passage 46 is entirely included in the outer perimeter of the cavity 30, the internal walls of the cavity, including the top wall formed by the etch stop layer 18, may be oxidized through the nozzle 32, thereby forming an etch stop for the etch process in which the ink supply passage 46 is formed. Then, communication between the ink supply passage 46 and the cavity 30 will established by removing the oxide layer that had formed the etch stop.

Figure 12:
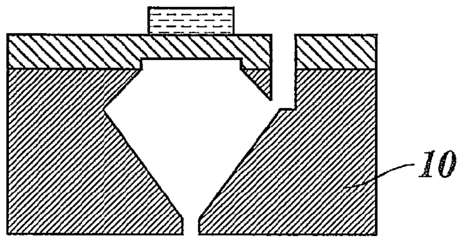

Finally, the SiRN layer 42 and oxide layer 40 are removed so as to obtain the finished product shown in FIG. 12.

Figure 8:
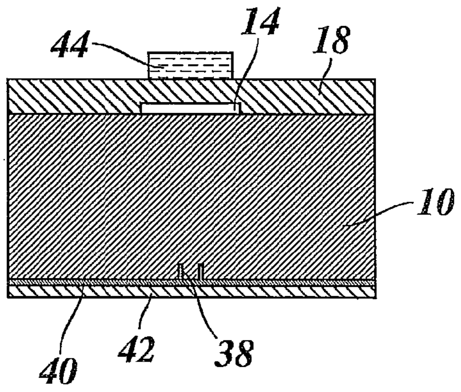

It will be understood that, in the steps subsequent to FIG. 8, the actuator 44 should be protected against the attack of the processing media, as far as necessary. As an alternative, the actuator 44 may be formed only in the final stage or may be formed separately and then bonded to the ink jet device.

While FIG. 12 shows only a single ink jet device comprising the nozzle 32 and the cavity 30 as the ink chamber, it will be understood that the part of the substrate 10 that has been shown in this figure forms part of a larger wafer in which a large number of ink jet devices are formed in a two-dimensional array, which may then be diced to form a plurality of multi-nozzle ink jet arrays. Within such an array, the distance between adjacent nozzles 32 will determine the print resolution of the ink jet device. In this context, the method that has been described above has an advantage that, even though the substrate 10 has a relatively large thickness of e.g. 300 μm, the cavity 30 extends mainly in the thickness direction of the substrate and has relatively small dimensions in the direction normal to the direction of the nozzle 32. As a consequence, the cavities 30 can be arranged with high density and with correspondingly small distances from nozzle to nozzle.

Moreover, although not shown in FIG. 12, a filter chamber may communicate with the cavity 30. Then, ink may be supplied into the filter chamber and may be filtered by a filter pattern that has been etched into the layer 18, and ink will then enter into the cavity 30 from which it is expelled through the nozzle. The wall 34 of the cavity 30 may serve as a membrane which may be flexed by means of an actuator so as to reduce the volume of the cavity 30 and thereby expel an ink droplet through the nozzle 32.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of forming a nozzle and an ink chamber of an ink jet device, comprising the steps of:

forming a nozzle passage by subjecting a substrate to a directional first etch process from one side of the substrate;

applying a second etch process from the same side of the substrate for widening an internal part of the nozzle passage, to form a cavity forming at least a portion of the ink chamber adjacent to the nozzle; and controlling the shape of the cavity by providing, on the opposite side of the substrate, an underlying layer buried under an etch stop layer and by allowing the second etch process to proceed into the underlying layer, wherein the second etch process takes place in the underlying layer at a higher etching rate than in the etch stop layer and the substrate, wherein the following steps precede the first etch process:

forming an annular trench in the substrate on the side of the substrate where the nozzle is to be formed; and passivating the walls of the trench so as to become resistant against the second etch process, and wherein the material surrounded by the trench is removed in the first etch process.

2. The method according to claim 1, wherein the substrate is formed by a single crystal, the second etch process is a process with different etch rates for different crystallographic directions of the substrate, and the nozzle passage is formed in a direction inclined relative to the crystallographic directions in which the etch rate is slowest, thereby forming a cavity with walls that taper towards the nozzle.

3. The method according to claim 2, wherein the second etch process is a wet etch process.

4. The method according to claim 3, wherein the etch process is a KOH wet etch process.

5. The method according to claim 1, wherein at least a component of a piezoelectric actuator is formed on a portion of the etch stop layer that covers the underlying layer.

6. The method according to claim 1, wherein, after the second etch process, an ink supply passage is formed by etching through the etch stop layer and part of the substrate, thereby forming a passage that communicates with the cavity.

7. The method according to claim 1, wherein the etch accelerating layer is a layer of poly-silicon.

* * * * *